United States Patent [19]
Salgado

[11] Patent Number: 5,831,747
[45] Date of Patent: Nov. 3, 1998

[54] METHOD AND APPARATUS FOR BORDERIZING AN IMAGE IN A PRINTING SYSTEM

[75] Inventor: David L. Salgado, Victor, N.Y.

[73] Assignee: Xerox Corporation, Stamford, Conn.

[21] Appl. No.: 493,834

[22] Filed: Jun. 22, 1995

[51] Int. Cl.[6] .................................................. H04N 1/387
[52] U.S. Cl. .......................... 358/453; 358/449; 358/451; 382/298
[58] Field of Search .................................. 358/448, 449, 358/451, 453; 382/298, 276

[56] References Cited

U.S. PATENT DOCUMENTS

| 5,001,574 | 3/1991 | Shimizu et al. | 358/448 |
| 5,053,885 | 10/1991 | Telle | 358/449 |
| 5,138,366 | 8/1992 | Maronian | 355/32 |
| 5,140,348 | 8/1992 | Jamzadeh et al. | 346/157 |
| 5,319,470 | 6/1994 | Shukunami | 358/451 |

*Primary Examiner*—Thomas D. Lee
*Attorney, Agent, or Firm*—Gary B. Cohen

[57] ABSTRACT

A method and apparatus for framing an image portion in which a size attribute of the applicable frame is inputted with a user interface and dimensions of the image portion are stored in memory. A processor determines, by reference to the inputted size attribute and the stored dimensions, whether a preselected relationship exists between the image portion and the applicable frame. When the preselected relationship does not exist, the image portion is scaled with an image processing subsystem.

17 Claims, 8 Drawing Sheets

METHOD AND APPARATUS FOR BORDERIZING AN IMAGE IN A PRINTING SYSTEM

The present invention relates generally to a technique for producing a print with a printing machine and, more particularly, for optimizing the marking of an image, with a corresponding frame, on a print media sheet.

A user can, with a conventional image processing system, produce a print in which an associated image is provided with a border or mat to enhance the appearance of such print. This sort of operation is sometimes referred to as "borderization". In one example, a bitmap, corresponding with an image is provided to a workstation or personal computer, such as a Macintosh personal computer ("Macintosh" is a trademark of Apple Computer, Inc.), and the image thereby merged into a border or mat. As disclosed by the following patent, these types of merge operations are performed on a routine basis in the photographic industry:

U.S. Pat. No. 5,138,366

Patentee: Maronian

Issued: Apr. 11, 1992

U.S. Pat. No. 5,138,366 discloses, in one embodiment, an arrangement in which an easel is positioned underneath a projector. A sheet of photographic paper is positioned on the easel and a mask is placed over the sheet to cover selected edge portions. The uncovered portion of the sheet is then exposed with the projector and a mask is placed over the exposed portion so that the edge portions can be exposed. As a result of this dual exposure process, a border can be provided about the periphery of an inner picture area. As disclosed further by U.S. Pat. No. 5,138,366, the above-described approach can be automated with a suitable thermal or xerographic printing machine. Borderizing techniques are further disclosed by the following patents:

U.S. Pat. No. 5,001,574

Patentees: Shimizu et al.

Issued: May 19, 1991

U.S. Pat. No. 5,140,348

Patentees: Jamzadeh et al.

Issued: Aug. 18, 1992

U.S. Pat. No. 5,001,574 discloses a digital copier which generates video signals by processing image signals. The digital copier includes a detector for detecting the coordinates of an original image and a controller for storing corresponding coordinate signals from the detector. In one mode of operation, a designated image portion is copied onto a substrate with a mat surrounding the image portion.

U.S. Pat. No. 5,140,348 discloses a digital color copying machine with memory, a suitable processor and a marking engine. In operation, stored image signals are transmitted from the memory to the marking image to generate at least one print in which an image is framed by a mat. The mat may be drawn in a color which corresponds with one of the dominant colors present in the image.

Pertinent portions of each of the the above-discussed references is incorporated herein by reference.

While each of the above-referenced patents provide varying degrees of teachings regarding techniques for borderizing an image, none of the patents appear to show an appreciation for optimizing a relationship between the border and its corresponding inner image(s). For example, in both of U.S. Pat. No. 5,001,574 and U.S. Pat. No. 5,140,348, borders are shown drawn around the periphery of blank areas. Ideally, a border would be designed in view of attributes of its corresponding inner image. More particularly, providing the relatively narrow border shown in U.S. Pat. No. 5,140,348 to a print having a relatively small corresponding inner image would be unsuitable while providing the relatively wide border shown in U.S. Pat. No. 5,001,574 to a print with a relatively large corresponding inner image would be equally unsuitable. It would be desirable to provide a printing system in which borders are optimized, relative to their corresponding inner image, either automatically or in accordance with particular variables provided by a user of the printing system.

In accordance with the present invention, there is provided a system for use in a printing system of the type in which a print having a representation of an image, is produced. The printing system includes a memory for storing image data corresponding with the image, the image data including a plurality of pixels defining the image, the image including a first image portion and a second image portion. The first image portion and the second image portion include a first set of dimensions and a second set of dimensions, respectively. The system generates a border to be positioned relative to an edge of the first image portion, the border including an inner border edge and an outer border edge spaced from the inner border edge. The system includes: a) a user interface for inputting a size attribute representative of the border to be generated, the size attribute defining a magnitude of the spacing between the inner border edge and the outer border edge; b) a processor for determining, by reference to the size attribute and the dimensions of the second set of dimensions, whether a preselected relationship exists between the second image portion and the border; and c) an image processing subsystem for scaling the second image portion, by a selected amount, when the preselected relationship does not exist.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
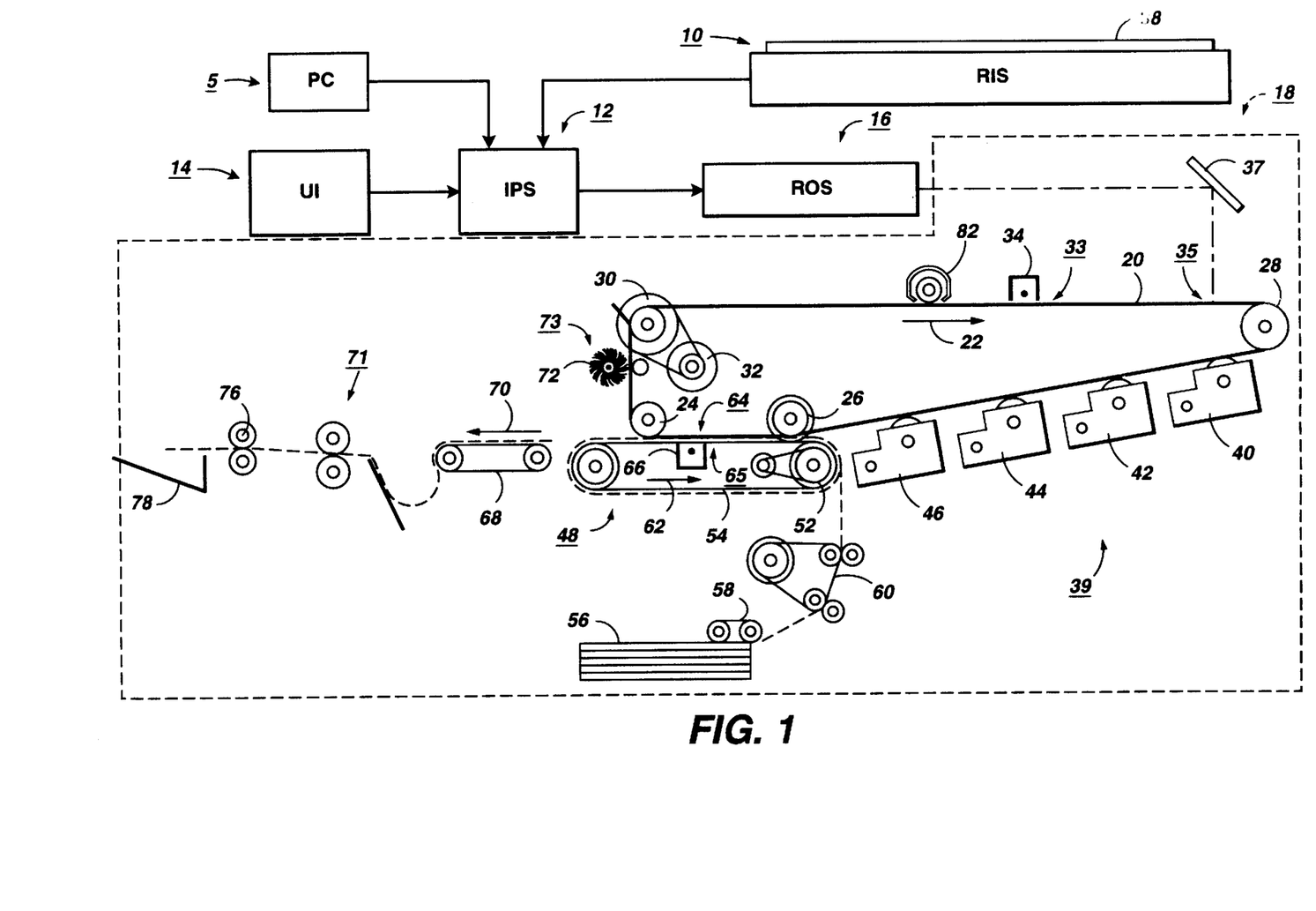
FIG. 1 is an elevational view of a color printing machine which includes the subsystems necessary to implement the technique of the subject invention.

For a general understanding of the features of the present invention, reference is made to the drawings. FIG. 1 is a schematic elevational view showing an exemplary electrophotographic printing machine and a networked PC which may incorporate features of the present invention therein. It will become evident from the following discussion that the system of the present invention is equally well suited for use in a wide variety of printing and copying systems, and therefore is not limited in application to the particular system(s) shown and described herein.

To begin by way of general explanation, FIG. 1 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 1), as well as carry out the trapping system in accordance with the present invention as described in association with FIGS. 1 through 16 below.

As further shown in FIG. 1, a multiple color original document 38 may be positioned on a raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Digitized electronic documents may be created, trapped, modified, stored and/or otherwise processed by PC 5 prior to transmission/relay to IPS 12 for printing on printer 18. The display of PC 5 may show electronic documents on a screen (not shown in FIG. 1). The screen of PC 5 may also display and interface with the IPS 12 processor(s) and controller(s), to include those for adjusting printer color and gray balance in accordance with the present invention as described in association with FIGS. 1 through 11 below. IPS 12 may include the processor(s) and controller(s) (not shown in FIG. 1) required to perform the trapping system of the present invention.

IPS 12 also may transmits signals corresponding to the desired electronic or scanned image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 1, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photo-conductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 1) extends between belts 54 and moves in unison therewith. A sheet 25 is advanced from a stack of sheets 56 disposed on a tray. A friction retard feeder 58 advances the uppermost sheet from stack 56 onto a pretransfer transport 60. Transport 60 advances the sheet to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 1) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 2:
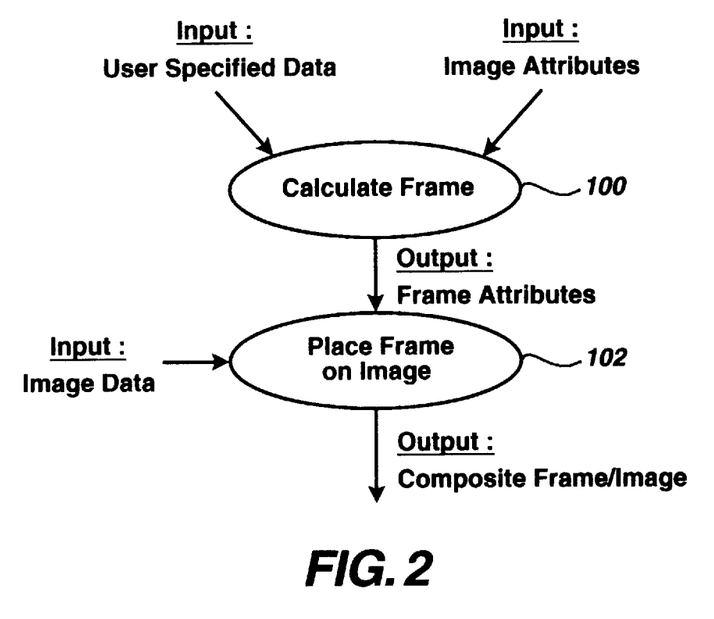
FIG. 2 is a schematic diagram illustrating a first aspect of the preferred embodiment of the subject invention.

Referring to FIGS. 2–4, 6 and 7, a first aspect of the preferred embodiment is discussed. To appreciate the basic concepts underlying the first aspect, reference is made specifically to FIG. 2. As shown in FIG. 2, an image is framed by first calculating a frame (step 100) and then placing the frame on the image (step 102). In step 100, a system user provides two types of inputs, namely user specified data and image attributes. In one example, user specified data includes some of the following:

Color: Options for frame color include 1) selecting from standard colors, 2) selecting from custom colors (preset by a user), or 3) permitting machine to automatically provide a color;

Size: Options for frame size include 1) permitting the user to enter frame size via keypad, edit pad or the like, or 2) permitting the machine to automatically set frame size;

Texture: Preferably, texture is either chosen by the user, via a suitable palette provided with a user interface or automatically set by the machine; and Style: A special option which permits the user to, for example, occlude a portion of the image being framed.

In step 102, the attributes of the frame are calculated in accordance with an algorithm discussed below. It should be appreciated that while the generalized scheme of FIG. 2 illustrates the framing of a single image, the procedure of FIG. 2 could be used to frame multiple images by simply repeating the procedure for each image to be framed.

Essentially, as discussed in further detail below, the method underlying the first aspect employs a suitable structural arrangement, such as the arrangement shown in FIG. 1, to frame an image in accordance with the following five generalized steps: First, the processor obtains user specified data and image attributes from one or more storage locations. Second, using the obtained information, frame attributes, including frame size, frame placement, changes to original image, are calculated. Third, any appropriate steps, e.g. masking, are executed, with the processor, to create a frame/image composite. Fourth, a representation is displayed on a display screen of the UI 14 (FIG. 1), for permitting the user to confirm that the frame/image composite is acceptable. Finally, a print of the composite is produced, with the print engine of FIG. 1. In one example, the composite may be scaled to accommodate print production on a print media sheet whose size varies significantly from the created composite image.

Figure 3:
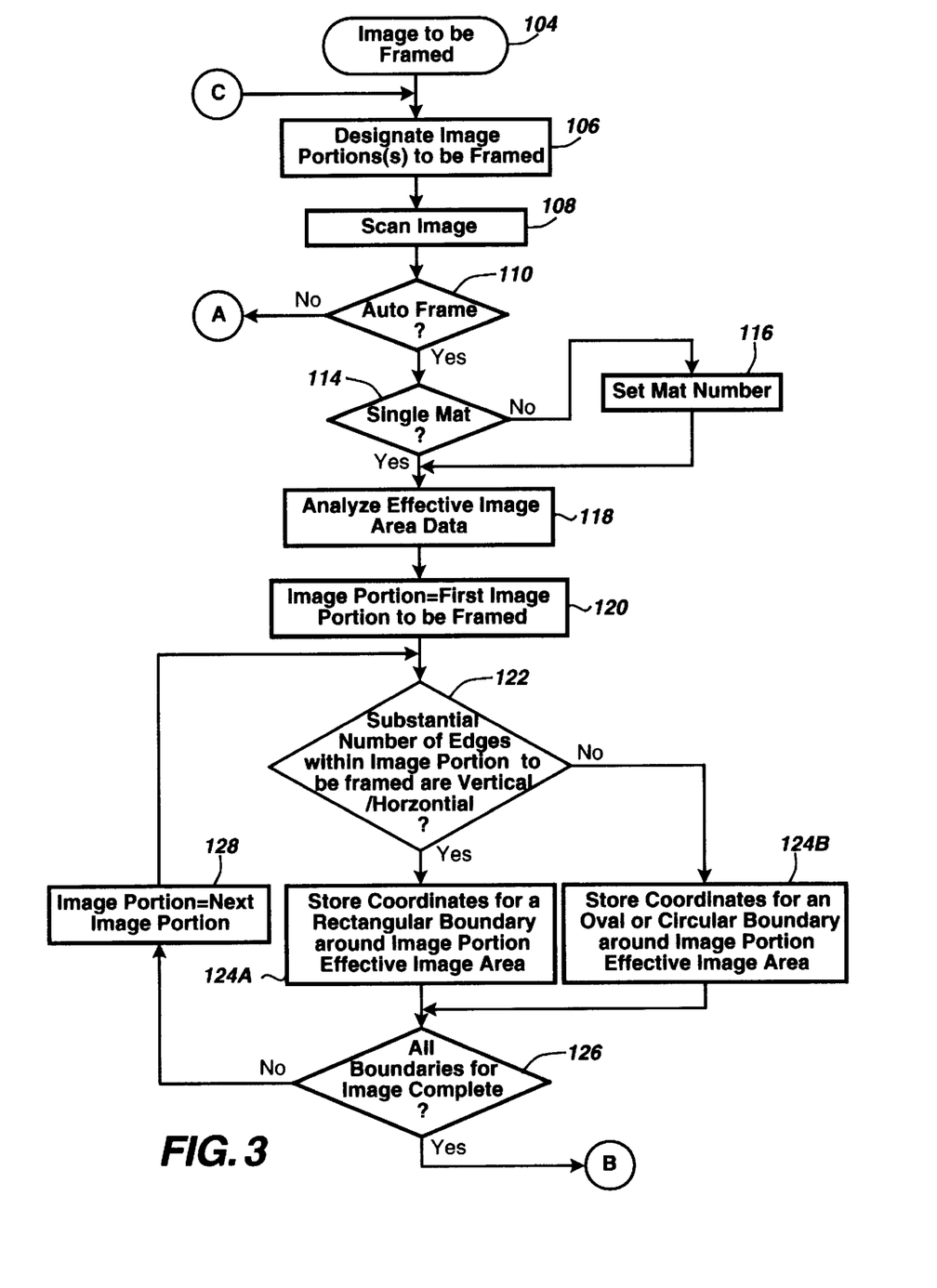
FIGS. 3 and 4 represent a flow diagram illustrating a preferred mode of operation of the first aspect of the preferred embodiment.
Figure 4:
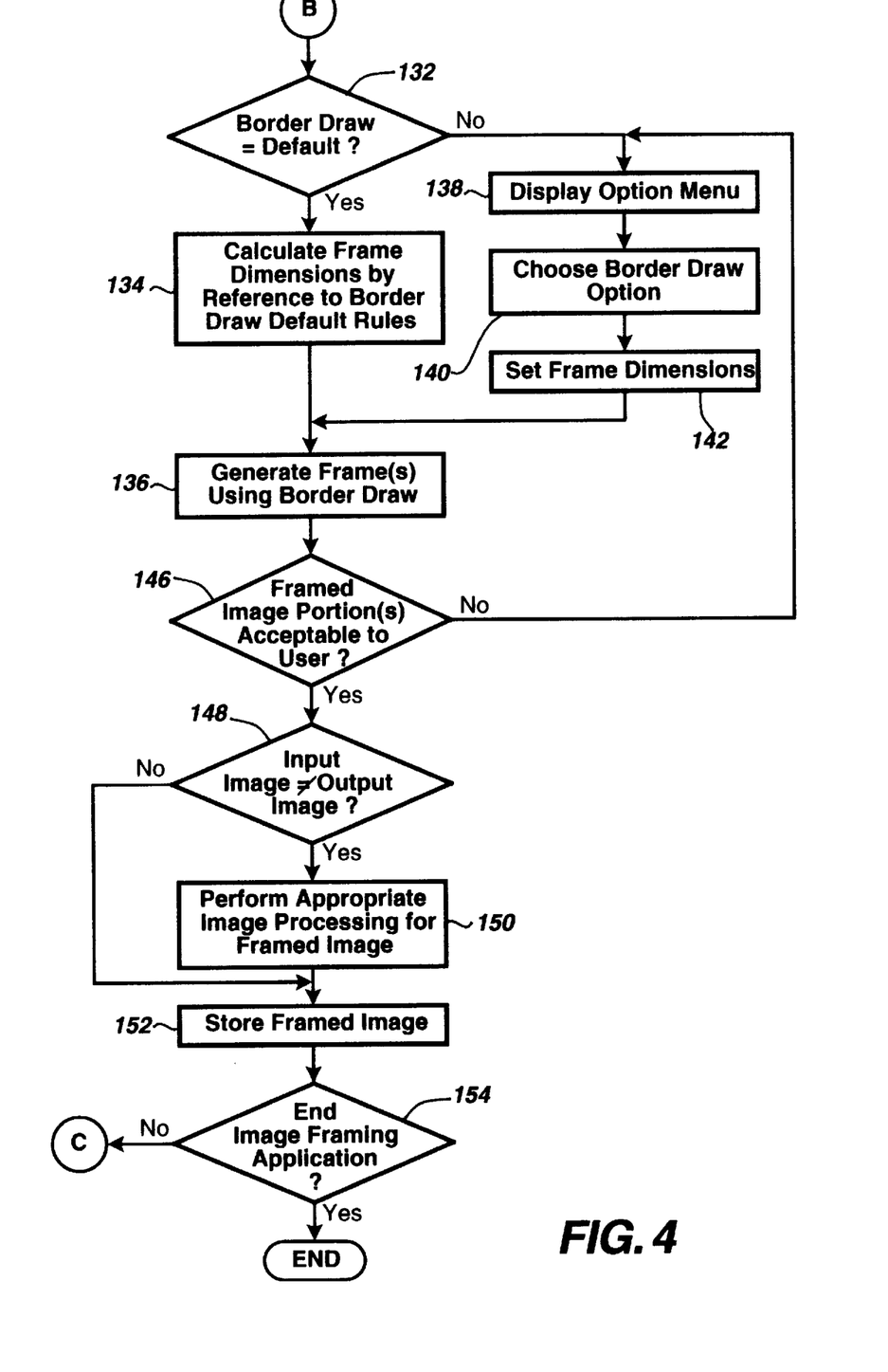

Referring specifically to FIGS. 3 and 4, further detail regarding the first aspect of the preferred embodiment is provided. At step 104 and 106 (FIG. 3), a user designates one or more image portions, within an electronic page, to be framed. The step 106 can be implemented with one of various suitable technologies. In one example, a user circles one or more image portions to be framed with a colored marker. In turn, when the document is scanned, at step 108, corresponding information regarding the portions to be framed is stored in memory. This marker edit technology is available by way of the Konica 8028 copier. In other examples, images could be designated by use of a suitable digital editing pad, made available in the Kodak 1575 digital copier.

Once all appropriate information is gathered by the printing system, it is decided, at step 110, whether the first or second aspect of the preferred embodiment is to be executed. In the present discussion of the first aspect, the process proceeds to step 114 where a decision is made as to how many frames will be positioned around the image portions to be framed. While the steps 114 and 116 show a multiple framing technique for a single image portion, as will be appreciated by those skilled in the art, the steps 114 and 116 could be modified to allow for individual customization of multiple single image portions.

At step 118, the edges of each image portion in the electronic page are analyzed. As will appear, this step facilitates the sorts of determinations discussed below. Moreover, the step 118 can be implemented with any conventional edge analyzing application. Such application would, among other things, locate positional information (e.g. where a boundary is located relative to an electronic page edge) and store the positional information in a suitable memory area. Once the edges of the image portion(s) is analyzed, a frame type is set for a first image portion to be framed via steps 122, 124A/124B and 126. More particularly, it is determined, at step 122, whether the edges of the designated image portion are substantially vertical/horizontal. It has been decided that when the edges are vertical/horizontal, the frame is to be rectangular (step 124A) and when the edges are not vertical/horizontal, the frame is to be circular or eliptical (step 124B). This decision is based on the observation that rounded images have a more pleasing appearance when surrounded by a circular or ovalular border. It will be appreciated that other border shapes could be employed based on the edge analysis. If multiple image portions are to be framed (see step 126), then the process loops back to step 122 by way of step 128, otherwise the process proceeds to a subroutine of FIG. 4 in which the frame(s) contemplated by the steps of FIG. 3 is drawn.

It should be appreciated that step 122 looks to the edges within the image portion in order to determine the shape of the frame. This permits multiple frame shapes to be used for a given electronic page. That is, in one example the electronic page may be framed with a rectangualar (or square) frame while a group of inner images may be framed with rectangular and circular (or eliptical) frames. By the same token, the frame of the electronic page may be circular (eliptical) while a group of inner images may be framed with rectangular and circular frames.

A decision is made at step 132 (FIG. 4) as to whether a frame is to be generated automatically or with the aid of user input. Preferably, the frame is calculated, via step 134, in accordance with a set of rules. In calculating a frame, an inner border edge and an outer border edge are determined. Details regarding the inner and outer border edges will appear below in the discussion of FIG. 7. As indicated or implied above, either border edge can be straight or curved. Essentially, the set of rules dictates, among other things, the mathematical function associated with each border edge and the proximity of the inner border edge to a corresponding image portion. It should be appreciated that the rules take into account the proximity of each image portion of the electronic page to one another. As will appear from the example provided below, the rules may be directed to the proportionality of the frame dimensions as a whole. Once the frame dimensions have been set the composite frame/image is generated as a bitmap (step 136) in accordance with image-related information stored in memory. Generating the bitmap with the stored information is a known process that may be achieved with a make ready subsystem of the type available in a wide variety of available printing systems.

In an alternative approach, a system user would set-up and calculate one or more frames by way of steps 138, 140 and 142. More particularly, initially the user would be provided, via the UI 14 of FIG. 1, a menu option that would lead the user to a BorderDraw option where the user would directly or indirectly choose the function(s) to be used in drawing the inner and outer border edges. In this option, the user would also manually set the dimensions of the inner and outer border edges. It will be appreciated that in yet another embodiment, frames could be provided by matching one of a set of frame templates to the image portion or portions being framed. In this approach, the system processor would survey a subject image portion and choose a suitable template frame from memory. The template fitting approach will be made clearer from the discussion of the second aspect of the preferred embodiment which follows below.

As can be understood, a user may desire to view the appearance of a buffered bitmap corresponding with a given frame/image composite. Accordingly, at step 146, a frame/image composite bitmap is displayed for the user and the user is provided with the opportunity to approve or disapprove of the composite. In the case of disapproval, the process loops back to step 138 where the frame dimensions can be reset. It will be appreciated that in the case of disapproval, some assistance would preferably be provided to the user in setting frame dimensions. For instance, the user would, in one example, be provided with the dimensions used to generate the inner and outer border edges of the current composite.

Once the user is satisfied with the buffered composite, the input image, i.e. the image associated with the buffered composite, is compared with the output image (step 148) to be produced on the basis of the composite. If the input and output images differ by a preselected amount, then an automatic scaling operation is performed (step 150) such that the user is provided with an image that fills a resulting print media sheet. The auto-scaling operation will be discussed in further detail below. At step 152, the completed composite is stored, for eventual output, e.g. printing. In one example, the composite frame/image is generated with a digital copier such as the Xerox 5775 color copier. This copier includes a color fill application which is well suited for coloring an area defined by an inner border edge and an outer border edge. If further images are to be framed (step 154), then the process loops back to step 106, otherwise the first aspect of the preferred embodiment ends.

An example of the method of the first aspect is provided by reference to FIGS. 6A–6C and 7.

In accordance with the flow of step 100 (FIG. 2):

1) Frame color, frame size and frame texture are set by the machine;

2) Image Occlusion is prohibited;

3) The whole image is designated for framing; and

4) The machine calculates frame dimensions.

Figure 6A:
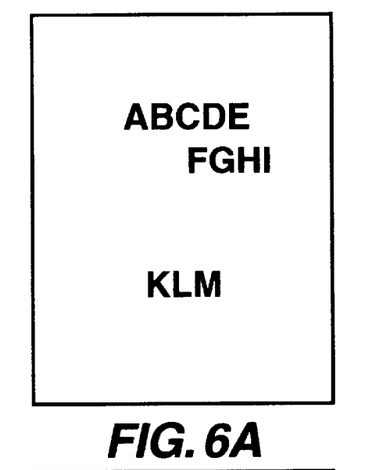
FIGS. 6A–6C are elevational views of images being processed in accordance with the first aspect of the preferred embodiment.
Figure 6B:
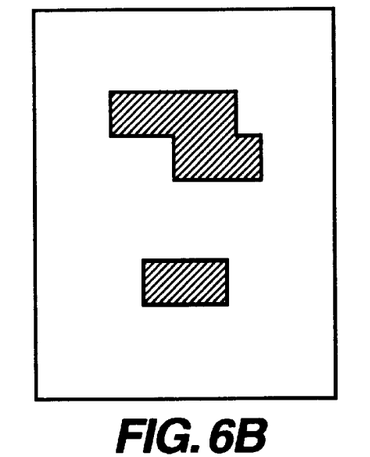
Figure 6C:
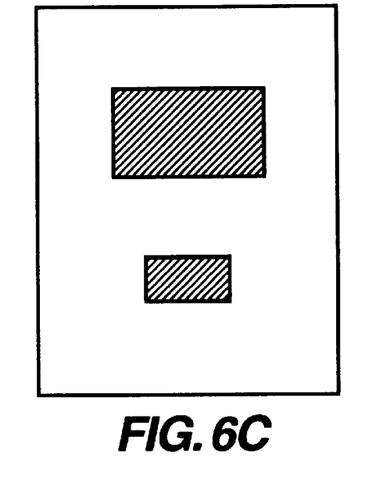

Referring specifically to FIGS. 6A and 6B, in general accordance with step 102 of FIG. 2 and specific accordance with selected steps of FIGS. 3 and 4, standard image processing is employed to analyze the effective image areas of respective image portions (see step 118 of FIG. 3). The effective image areas or portions are simplified for purposes of performing steps 122 and 124A/124B—in the example, the image portions possess vertical/horizontal edges, thus the frame is set to be rectangular. In conjunction with analyzing the effective image areas, the processor determines the distances of the image areas relative to the input image edges.

Figure 7:
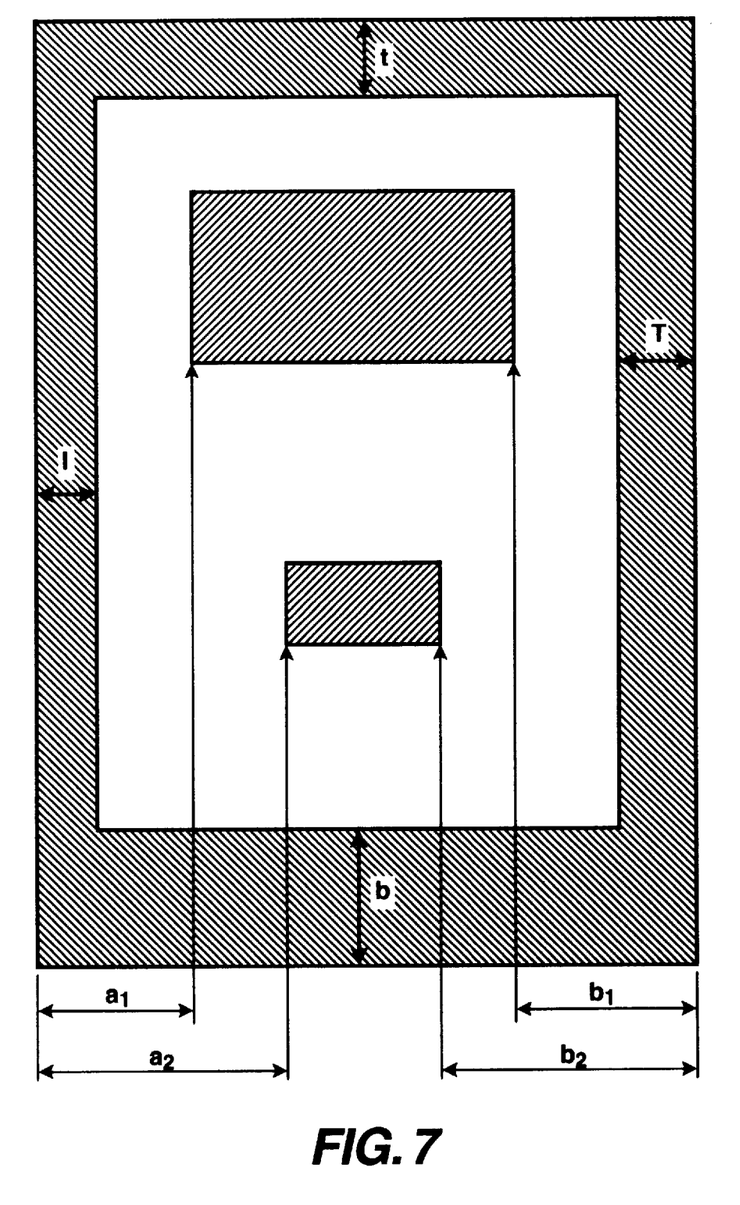
FIG. 7 is an elevational view of an image processed partially in accordance with the first aspect of the preferred embodiment, the partially processed image being shown with some of the dimensions used to calculate left and right frame portions to be disposed about left and right peripheral portions of the image of FIG. 6C.

In the example of FIG. 7, these distances are as follows:

$a_1 = 3$ units $a_2 = 6$ units $b_1 = 4$ units $b_2 = 6$ units

Following the default rules provided by the present example, $r = b_1/2$ and the default rules dictate that the magnitude of I is to be equal to r, so, $I = r = b_1/2$ and, $I = r = 4/2 = 2$ In another example, the rule would be set so that the right frame width would equal the left frame width. In that case, $r = I = 3/2 = 1.5$ In the present example, only the calculation of the border widths I and r are shown, but it will be understood that the calculation for b and t would be calculated in a similar manner.

Referring now to FIGS. 5 and 8A–8G, a second aspect of the preferred embodiment is discussed in detail. The basic premise of the second aspect is to provide a user with the ability to specify a frame for one or more sheets of a job in which various properties, namely width, color, image containment and margin, can be specified. Color defines the color or shading scheme for the frame. Image containment specifies whether the frame should overlay an image or the image should be subjected to auto-fit in order to accommodate for an unsuitable fit between the image and the frame. An overlay may be transparent or opaque.

With respect to the contemplated implementation of the second aspect, at step 160 (FIG. 5), the user sets the attributes of the frame (e.g. color, style, dimensions and margins) with the UI 14 (FIG. 1). Through use of a suitable application, a frame, generated in accordance with the input of step 160 is combined with a provided image to provide a frame/image composite (step 162). Information regarding the drawn frame/image composite is buffered and a suitable processor is employed to determine the relationship of the frame pixels to the image as a whole. If the frame overlaps portions of the image undesirably (step 164), as in FIG. 8B, then the image can be automatically reduced (steps 166 and 168) using a suitable auto-fit routine, such as that disclosed by U.S. Pat. No. 5,053,885 to Telle and U.S. Pat. No. 4,669,858 to Ito et al., the pertinent portions of which are incorporated herein by reference, to obtain a suitable relationship as shown, for example, in FIG. 8C. It will be appreciated that in some instances it may be appropriate to magnify, rather than reduce, an image in order to create a desirable relationship between the image portion and the frame.

Figure 8A:
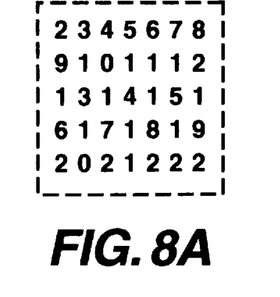
FIGS. 8A–8G are elevational views of image/frame composites generated in accordance with the second aspect of the preferred embodiment.
Figure 8B:
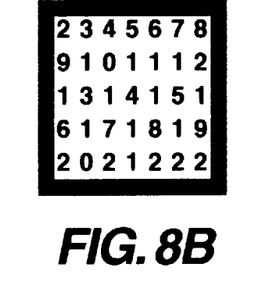
Figure 8C:
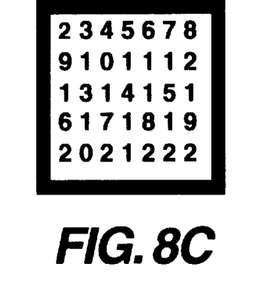

In conjunction with auto-scaling the image portion, the framed image is displayed (step 170), as shown in FIG. 8C. Assuming that the user is satisfied with the auto-scaled, framed image (see step 172), the framed image is stored at step 174, otherwise the process loops back to step 168 where the visible image portion is reduced again, automatically, by a machine selected increment.

Figure 5:
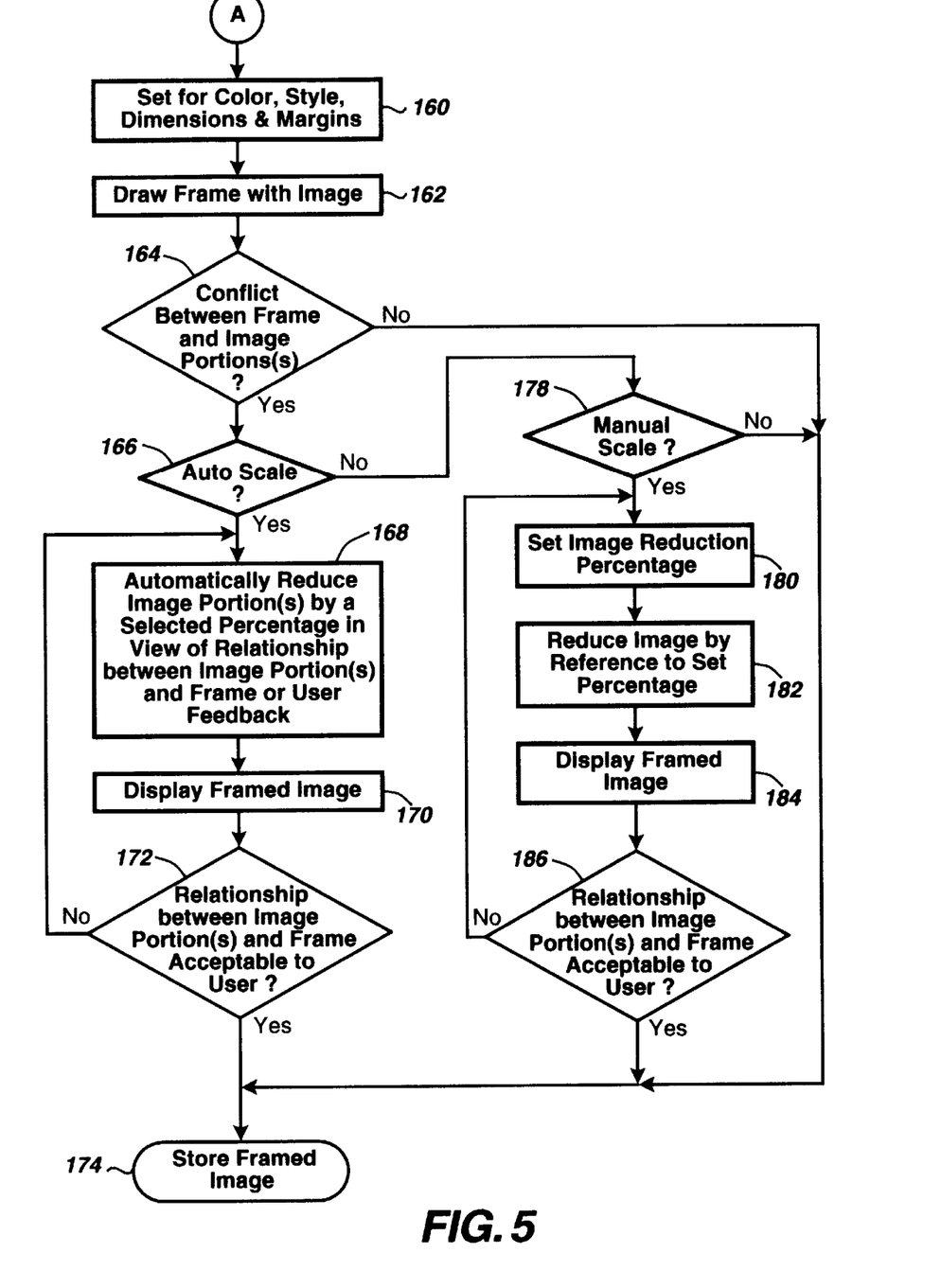
FIG. 5 represents a flow diagram illustrating a preferred mode of operation of a second aspect of the preferred embodiment.

In some instances, the user may wish to perform scaling in a manual fashion. Referring again to step 166, if a manual approach is desired (step 178), the user sets an amount of image reduction percentage to be achieved (step 180) and the subject image is reduced (step 182) in accordance with the setting step 180. Subsequent to the reduction step, the framed image is, at step 184, displayed on the UI 14 (FIG. 1). If the relationship between the framed image portion(s) and the frame is unacceptable (step 186), then the process returns to step 180 where the image reduction percentage can be reset, otherwise the process proceeds to step 174 where the framed image is stored.

Figure 8D:
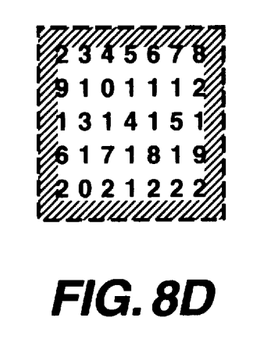

Further examples of the second aspect of the preferred embodiment are illustrated by FIGS. 8D–8G. Referring specifically to FIG. 8D, an example is provided in which the user sets the following parameters: 1) Frame Color=Gray, 2) Width=1.33 (Normalized Units), Image Containment= Transparent Overlay, and 4) Margin=0. In accordance with the settings, the image can be seen through the overlay which overlaps a part of the visible portion of the image. Preferably, the result of FIG. 8D is achieved with Manual Scale (see step 178) so that a conflict between the image and the frame can be obtained intentionally.

Figure 8E:
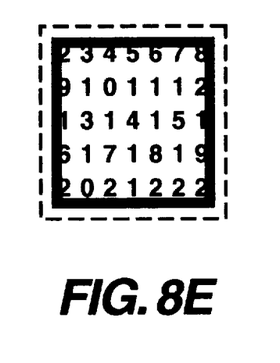

Referring to FIG. 8E, the following parameters are set by the user: 1) Frame Color=Black, 2) Width=0.67, Image Containment=Opaque Overlay, and 4) Margin=0.67. In accordance with these settings, the frame overlays a visible portion of the image so that such visible portion is obscured by the frame. Additionally, the frame, along with the image, is recessed from peripheral edges by way of a set of margins with the margins being designated by the user. As with the example of FIG. 8D, the result of FIG. 8E is preferably achieved with Manual Scale (see step 178) so that a conflict between the image and the frame can be obtained.

Figure 8F:
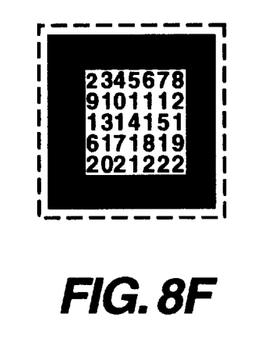

Referring to FIG. 8F, the following parameters are set by the user: 1) Frame Color=Black, 2) Width=1.33, Image Containment=Reduced, and 4) Margin=0.67. In accordance with these settings, the image is automatically reduced, as with the example for FIGS. 8A–8C discussed above, so that conflict between the frame and the image is avoided. Additionally, the frame, along with the image, is recessed from peripheral edges by way of a set of margins with the margins being designated by the user. While the result of FIG. 8F can be achieved with Manual Scale (see step 178), it is preferably achieved with Auto Scale (see step 166) where the image is automatically reduced and centered to obtain an optimum relationship between the frame and the image.

Figure 8G:
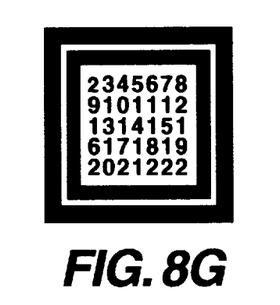

Referring to FIG. 8G, the second aspect of the disclosed embodiment permits the user to obtain multiple borders for a given electronic page or print. In particular, the user interface, for the illustrated embodiment of FIG. 8G, provides the user with the opportunity to input values for the number of borders desired and a preferred spacing between those borders. In the example of FIG. 8G, the number of borders is set at two and the spacing between the borders is set at an increment of one unit (e.g. one inch).

Numerous features of the above-disclosed embodiment will be appreciated by those skilled in the art. A first aspect of the disclosed embodiment is provided in which a relationship between an image and a frame is optimized in accordance with a set of rules. This ensures that the appearance of a resulting composite image/frame will be as pleasing, to the eye, as possible. In this way the frame is applied to a specific image rather than an indescript box or print outline.

A second aspect of the disclosed embodiment permits an image to be scaled automatically, in response to user approval, for providing an optimized relationship between an image and a frame. Alternatively, a user can modify the relationship between the image and the frame by way of a manual approach in which the user, among other things, sets the percentage reduction for the image. In this way, the user is provided with a high degree of flexibility in manipulating the appearance of a composite image/frame.

What is claimed is:

1. In a printing system for producing a print having a representation of an image, the printing system including a memory for storing image data corresponding with the image, the image including a first image portion and a second image portion, the first image portion and the second image portion including a first set of dimensions and a second set of dimensions, respectively, a system, responsive to operator input, for generating a border corresponding, at least in part, with the first image portion, the border including a non-white color as well as an inner border edge and an outer border edge spaced from the inner border edge, said system comprising:

a) a user interface at which the operator inputs a size attribute representative of the border to be generated, the size attribute including a width parameter, the width parameter defining a magnitude of the spacing between the inner border edge and the outer border edge, wherein the width parameter is settable by the operator in one of a plurality of width magnitude values so as to provide the operator control over the width magnitude of the border;

b) a processor for determining, by reference to the size attribute and the dimensions of the second set of dimensions, whether a preselected relationship exists between the second image portion and the border; and c) an image processing subsystem for scaling the second image portion, by a selected amount, when the preselected relationship does not exist.

2. The system of claim 1, in which the second image portion includes a plurality of edges and said processor determines that a spacing between at least one of the plurality of edges and the inner border edge is less than a preselected threshold magnitude, wherein said image processing subsystem reduces the second image portion in size to achieve the preselected relationship.

3. The system of claim 1, in which the second image portion includes a plurality of edges and said processor determines that each of the plurality of edges is spaced from the inner border edge by a preselected threshold magnitude, wherein said image processing subsystem enlarges the second image portion in size to achieve the preselected relationship.

4. The system of claim 1, in which an image containment attribute, assuming one of a first state and a second state, is inputted to the printing system, wherein, a conflict between the second image portion and the border is maintained when the image containment attribute is set in the first state.

5. The system of claim 1, in which a margin attribute is inputted by the operator to the printing system, and in which the border and the second image portion are printed on a print media sheet with an outer edge, wherein when the border and the second image portion are printed on the print media sheet a nonprinting zone is, in response to said margin attribute inputting, formed between the border outer edge and the print media sheet outer edge.

6. The system of claim 1, in which the preselected relationship does not exist and a scaling operation is performed, wherein a representation of the border with the scaled second image portion is displayed with the user interface.

7. The system of claim 1, further comprising printing a copy of the representation on a print media sheet upon approval by a user.

8. The system of claim 7, wherein the operator is provided with the ability to further scale the second image portion when the scaled second image portion does not meet his/her approval.

9. In a printing system for producing a print having a representation of an image, the printing system including a memory for storing image data corresponding with the image, the image including a first image portion and a second image portion, the first image portion and the second image portion including a first set of dimensions and a second set of dimensions, respectively, a method, responsive to operator input, for generating a border corresponding, at least in part, with the first image portion, the border including a non-white color as well as an inner border edge and an outer border edge spaced from the inner border edge, said method comprising:

a) inputting to the printing system, by way of operator input at a user interface, a size attribute for the border to be generated, the size attribute including a width parameter, the width parameter defining a magnitude of the spacing between the inner border edge and the outer border edge, wherein the width parameter is settable by the operator in one of a plurality of width magnitude values so as to provide the operator control over the width magnitude of the border;

b) determining, by reference to the size attribute and the dimensions of the second set of dimensions, whether a preselected relationship exists between the second image portion and the border; and c) when the preselected relationship does not exist, scaling the second image portion to an extent necessary so that the preselected relationship exists.

10. The method of claim 9, in which the second image portion includes a plurality of edges and said b) comprises determining that a spacing between at least one of the plurality of edges and the inner border edge is less than a preselected threshold magnitude, wherein said c) comprises reducing the second image portion in size to achieve the preselected relationship.

11. The method of claim 9, in which the second image portion includes a plurality of edges and said b) comprises determining that each of the plurality of edges is spaced from the inner border edge by a preselected threshold magnitude, wherein said c) comprises enlarging the second image portion in size to achieve the preselected relationship.

12. The method of claim 9, in which an image containment attribute, assuming one of a first state and a second state, is inputted to the printing system, further comprising maintaining a conflict between the second image portion and the border when the image containment attribute is set in the first state.

13. The method of claim 9, in which a margin attribute is inputted by the operator to the printing system, and in which the border and second image portion are printed on a print media sheet with an outer edge, further comprising:

in response to inputting the margin attribute, printing the border and second image portion in such a manner that a nonprinting zone is formed between the border outer edge and the print media sheet outer edge.

14. The method of claim 9, in which the preselected relationship does not exists and a scaling operation is performed, further comprising displaying a representation of the border with the scaled second image portion.

15. The method of claim 14, further comprising printing a copy of the representation on a print media sheet upon approval by a user.

16. The method of claim 14, further comprising providing a user with the ability to further scale the second image portion when the scaled second image portion does not meet his/her approval.

17. The method of claim 9, in which the border is generated on an electronic page as a first border, further comprising generating a second border, spaced from the first border on the electronic page, in response to a multiple border input command provided at the user interface.

* * * * *